No. 671,630. Patented Apr. 9, 1901.
L. MOND.
PROCESS OF MAKING GAS.
(Application filed June 1, 1898.)
(No Model.)
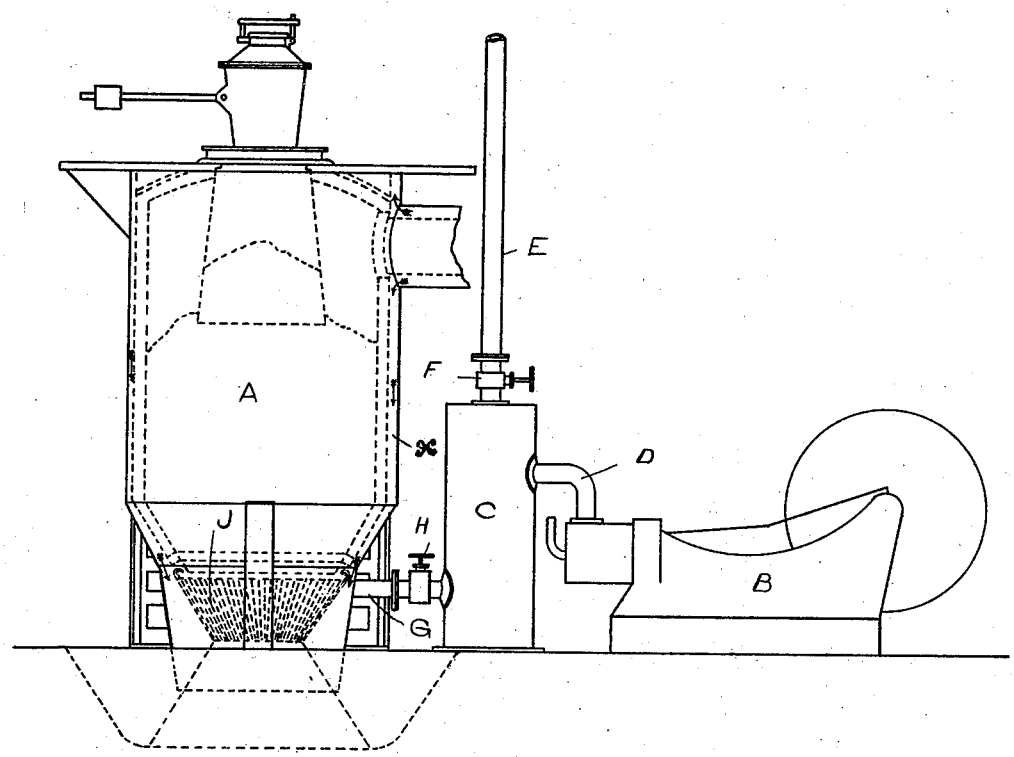
Witnesses.
F. S. Edmore
A. W. E. Kennedy.
Inventor
Ludwig Mond
By his Atty
P. T. Dodge

UNITED STATES PATENT OFFICE.

LUDWIG MOND, OF NORTHWICH, ENGLAND.

PROCESS OF MAKING GAS.

SPECIFICATION forming part of Letters Patent No. 671,630, dated April 9, 1901.

Application filed June 1, 1898. Serial No. 682,232. (No specimens.)

*To all whom it may concern:*

Be it known that I, LUDWIG MOND, manufacturing chemist, a subject of the Queen of Great Britain, residing at Winnington Hall, Northwich, in the county of Chester, England, have invented certain new and useful Improvements in Converting Fuel into Combustible Gases, (for which I have obtained provisional protection in England, No. 27,257, dated November 20, 1897,) of which the following is a specification.

This invention has for its object an improvement in converting fuel into combustible gases. This is generally effected by burning the fuel in gas-generators with air or mixtures of air and steam in such limited quantities as to convert the fuel (solid or liquid) into permanent gases, principally carbon monoxid and hydrogen.

My present invention consists in replacing part of the oxygen or steam now used for gasifying the fuel by carbon dioxid, which becomes reduced to carbon monoxid by contact with the incandescent carbon of the burning fuel. Each pound of fuel which by contact with carbon dioxid becomes converted into carbon monoxid yields twice the quantity of the latter gas in comparison to the quantity obtained in converting it by means of oxygen or steam. The quantity of combustible gas obtained from a given quantity of fuel is thus increased in proportion to the amount of carbon dioxid which can be introduced into the gas-generator in lieu of oxygen or steam. The reduction of the carbon dioxid by contact with carbon consumes, however, a large amount of heat, (calories,) which has to be supplied by another part of the fuel being burned by means of oxygen. The amount of oxygen replaceable by carbon dioxid is therefore limited, as by using too large a quantity of the latter the gas-generator would not remain hot enough for the gasification of the fuel. This amount also varies with the quality of the fuel, with the temperature at which the mixture of air, steam, and gases containing carbon dioxid is introduced into the generator, and with the amount of steam in this mixture.

In practice I find that the amount of oxygen which can be replaced by carbon dioxid without interfering with the working of the gas-generator varies between fifteen and thirty per cent., and that the yield of gases obtainable from the fuel is thereby increased accordingly.

The definite proportions of air, steam, and carbon dioxid which under certain conditions of fuel, &c., may be used in carrying out my process are as follows: air, fifty-eight volumes; carbon dioxid, four volumes; steam, thirty-eight volumes.

As a source of carbon dioxid I may use ordinary chimney-gases; but where they are available I prefer to use the exhaust-gases from gas-engines, which issue from these engines at a high temperature.

The accompanying drawing shows a front view of an arrangement for carrying my invention into practice.

A is the gas-generator; B, a gas-engine; D, exhaust-pipe from the gas-engine leading to a receiver C, which serves to equalize the pressure of the exhaust-gas and is provided with a conduit E and valve F, leading to the atmosphere, and another conduit G, with the valve H leading to the generator. These valves are so regulated as to get the desired quantity of exhaust-gases entering the generator.

The steam and air can enter the generator in any well-known manner; but I prefer to form the generator A and its gas-flue J with a jacket or casing X, substantially as described in my Patent No. 546,049. The steam and air then enter this jacket and from thence are supplied to the generator-furnace, exactly as set forth in my said specification. When, however, carbonic acid is admitted, a lesser amount of steam is required than where this is not the case. The heat of the generator is preferably kept at a low red heat in order to prevent the disassociation of the ammonia, and the amount of steam and carbonic acid supplied to the generator-furnace is regulated so as to keep the heat at dull redness.

Many other devices may of course be substituted for the one described for obtaining the same object.

In this manner the heat contained in that part of the exhaust-gases which is returned to the gas-generator, as well as the carbon dioxid contained in these exhaust-gases, are utilized to increase the yield of combustible gases and the power obtainable from the fuel consumed in the gas-generator.

I declare that what I claim is—

In the process of obtaining combustible gases from fuel, preventing the waste of heat and disassociation of ammonia by maintaining the fuel uniformly at a dull-red heat by continuously supplying it with a mixture of air, steam and carbon dioxid definitely proportioned for maintaining this temperature.

In witness whereof I have hereunto signed my name, this 20th day of May, 1898, in the presence of two subscribing witnesses.

LUDWIG MOND.

Witnesses:
CHARLES ROCHE,
RICHARD JOHN PARSONS.